United States Patent [19]
Murayama et al.

[11] Patent Number: 5,204,760
[45] Date of Patent: Apr. 20, 1993

[54] SYSTEM AND METHOD FOR CONVERTING CONTINUOUS HALF TONE IMAGE INTO PSEUDO HALF TONE IMAGE

[75] Inventors: Masayoshi Murayama; Fumitaka Sato, all of Tokyo, Japan

[73] Assignee: Kabushiki Kaisha Toshiba, Kawasaki, Japan

[21] Appl. No.: 749,531

[22] Filed: Aug. 26, 1991

[30] Foreign Application Priority Data

Aug. 27, 1990 [JP] Japan ................................ 2-225853
Aug. 27, 1990 [JP] Japan ................................ 2-225854

[51] Int. Cl.$^5$ .............................................. H04N 5/14
[52] U.S. Cl. ...................................... 358/456; 358/37; 358/457
[58] Field of Search ............ 358/162, 166, 37, 213.15, 358/213.17, 456–458

[56] References Cited

U.S. PATENT DOCUMENTS

| | | | |
|---|---|---|---|
| 4,680,639 | 7/1987 | Isono et a;. | 358/37 |
| 4,706,113 | 10/1987 | Ito et al. | 358/37 |
| 4,802,010 | 1/1989 | Skinner et al. | 358/162 |
| 4,809,070 | 2/1989 | Lake, Jr. | 358/37 |
| 4,989,096 | 1/1991 | Webb et al. | 358/456 |
| 5,051,844 | 9/1991 | Sullivan | 358/456 |
| 5,062,000 | 10/1991 | Harris et al. | 358/213.15 |

FOREIGN PATENT DOCUMENTS 1-97650 4/1989 Japan .

OTHER PUBLICATIONS

5 J. F. Jarvis et al., Computer Graphics and Image Processing, "A Survey of Techniques for the Display of Continuos Tone Pictures on Bilevel Displays" pp. 13–18 and 36–40 (1976).
"High Speed Bi-Level Image Processor of MED", pp. 43–46 by Yuji Maruyama, et al., Dec. 7, 1988.

*Primary Examiner*—Stephen Brinich
*Attorney, Agent, or Firm*—Finnegan, Henderson, Farabow, Garrett & Dunner

[57] ABSTRACT

In processing of a minimizer average error method (or an error diffusion method), a threshold value for determining whether a point (pixel) as an object to be processed is a black or white dot is changed in accordance with the pixel position using a threshold value matrix having a two-dimensional repetitive pattern. When a one-dot size in an output apparatus which can only perform binary expression in units of pixels is larger than a logical size, a continuous tone image is converted into a pseudo half tone image in consideration of an increase in size of a dot into other dots (projecting portions).

14 Claims, 9 Drawing Sheets

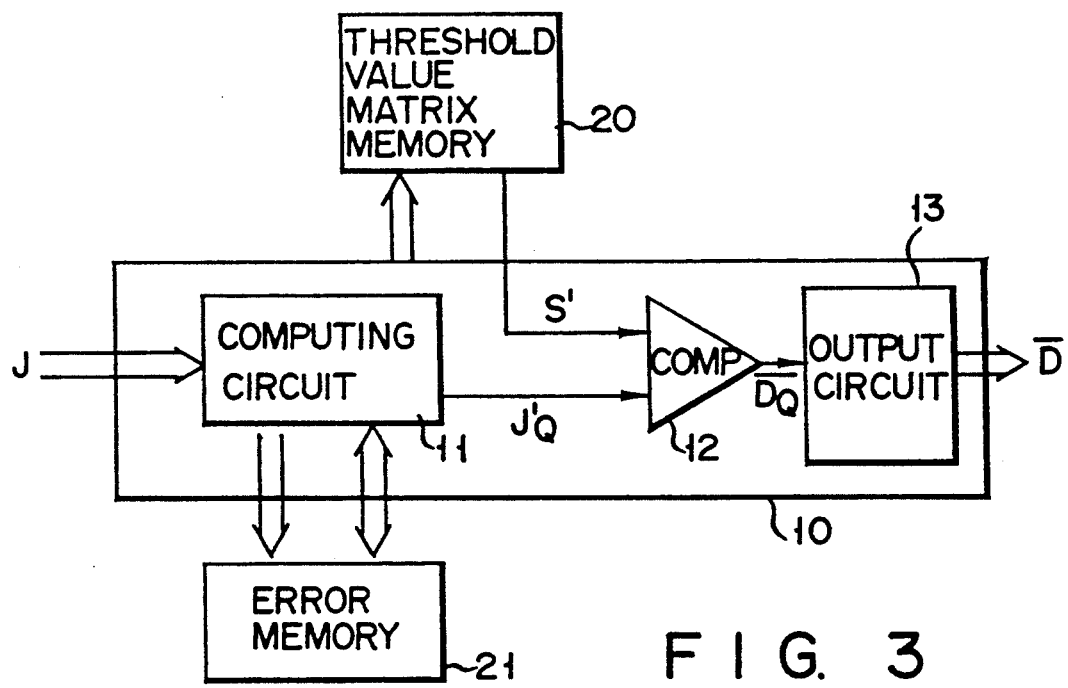
FIG. 3
FIG. 4
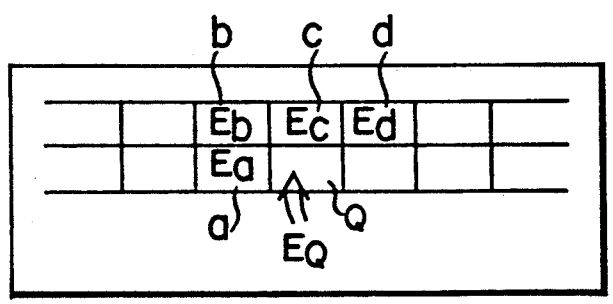
FIG. 5

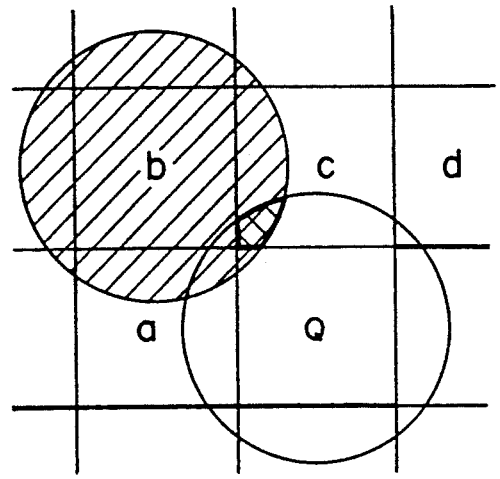
FIG. 11
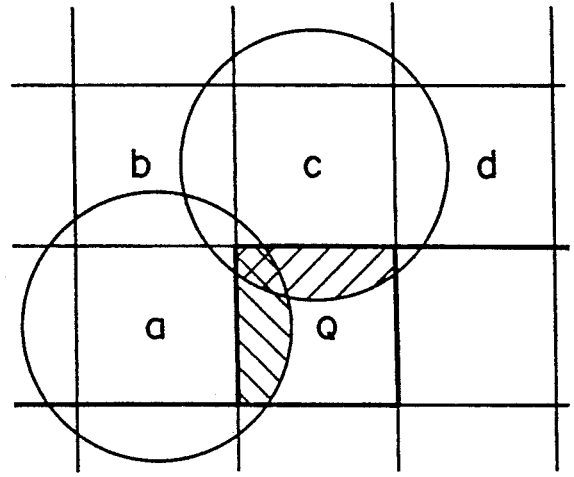
FIG. 13
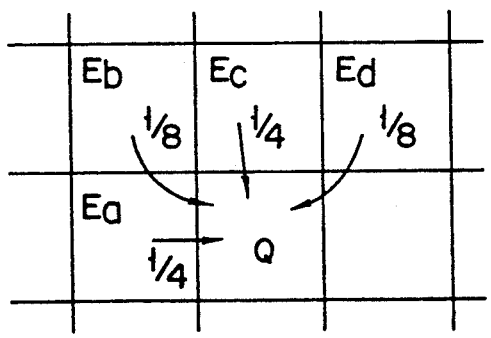
FIG. 14
| $12/16$ | $10/16$ | $6/16$ | $8/16$ |
|---|---|---|---|
| $14/16$ | $16/16$ | $4/16$ | $2/16$ |
| $5/16$ | $7/16$ | $11/16$ | $9/16$ |
| $3/16$ | $1/16$ | $13/16$ | $15/16$ |
FIG. 15

| $\overline{D}a, \overline{D}b, \overline{D}c, \overline{D}d$ \ $\overline{D}Q$ | 0 | 1 |
|---|---|---|
| 0 0 0 0 | 0 | 1+2F+2f |
| 0 0 0 1 | f | 1+2F+f-g |
| 0 0 1 0 | F | 1+F |
| 0 0 1 1 | F | 1+F |
| 0 1 0 0 | f | 1+2F-2g+f |
| 0 1 0 1 | 2f | 1+2F-3g |
| 0 1 1 0 | F | 1+F-g |
| 0 1 1 1 | F | 1+F-g |
| 1 0 0 0 | F | 1+F |
| 1 0 0 1 | F+f | 1+F-f-g |
| 1 0 1 0 | 2F-g | 1 |
| 1 0 1 1 | 2F-g | 1 |
| 1 1 0 0 | F | 1+F-g |
| 1 1 0 1 | F+f | 1+F-2g |
| 1 1 1 0 | 2F-g | 1 |
| 1 1 1 1 | 2F-g | 1 |

FIG. 12

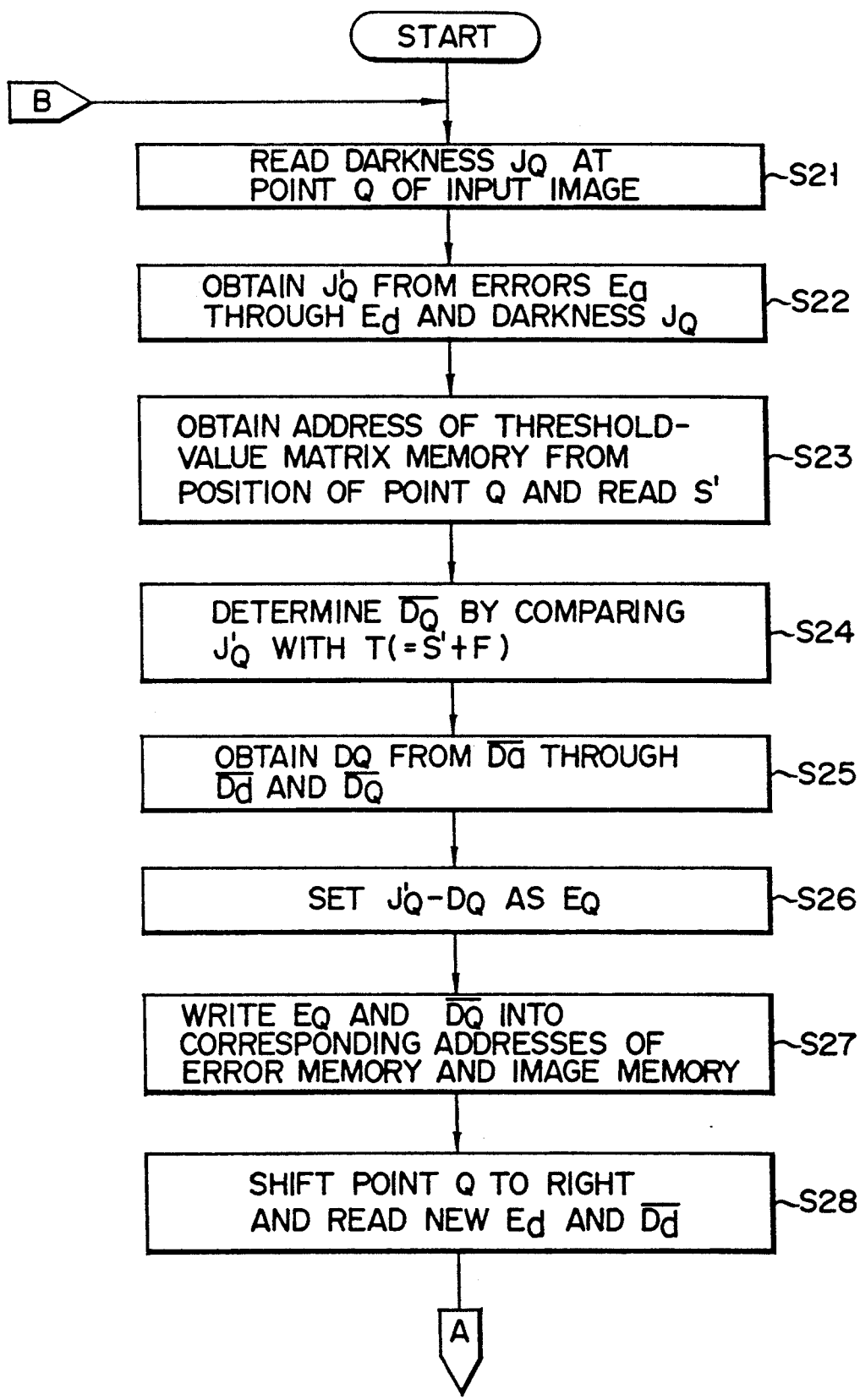
F I G. 16A

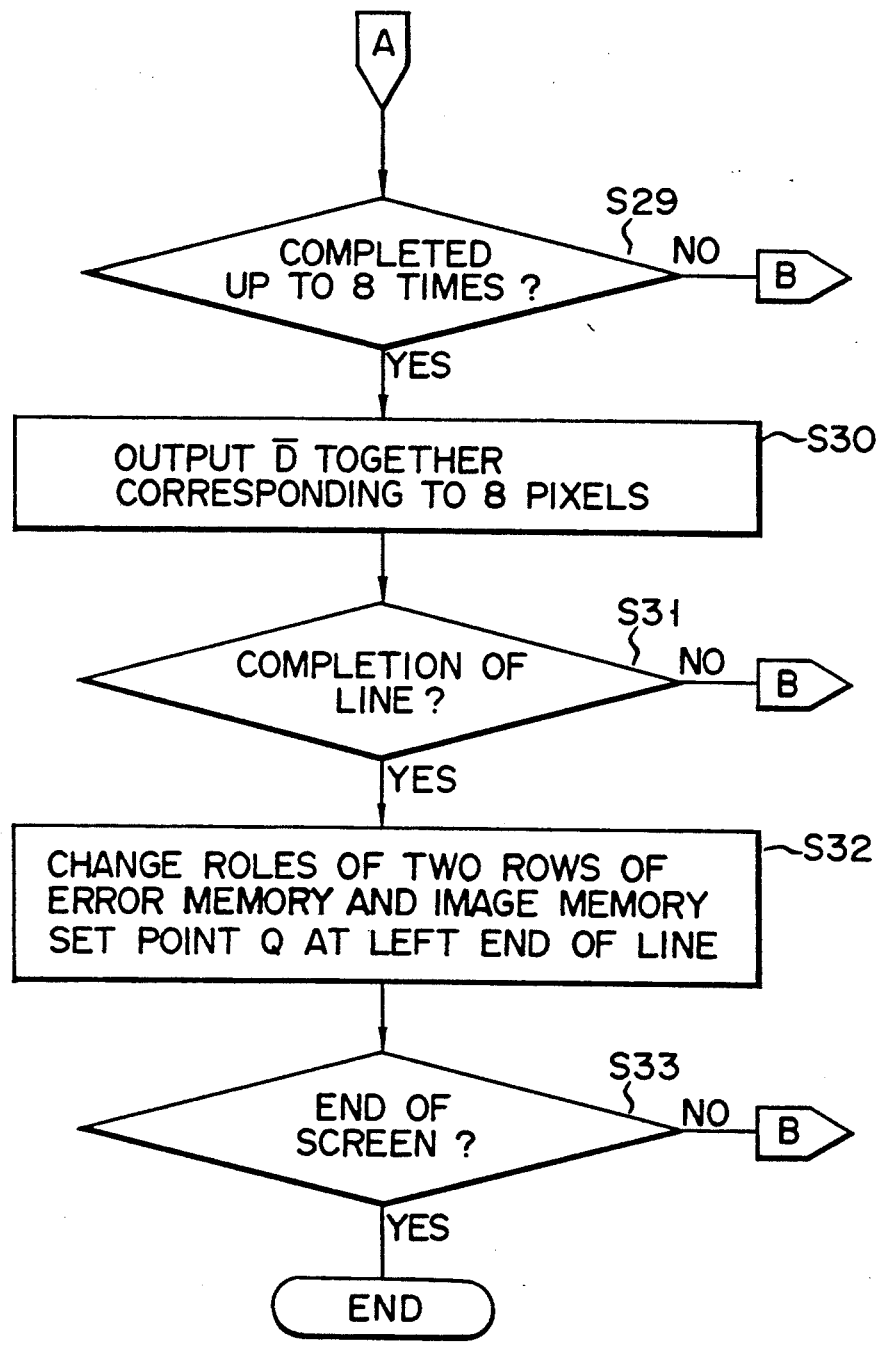
F I G. 16B

SYSTEM AND METHOD FOR CONVERTING CONTINUOUS HALF TONE IMAGE INTO PSEUDO HALF TONE IMAGE

BACKGROUND OF THE INVENTION

1. Field of the Invention

The present invention relates to a method for converting a continuous tone image for approximately displaying a continuous tone image into a pseudo half tone image using an output apparatus which can only perform binary expression in units of pixels.

2. Description of the Related Art

As a conventional method for forming a half tone image, various methods have been proposed. For example, as described in Hirotsugu Yamada, Michihiko Mino, and Toshiyuki Sakai, "Binary Expression Method of Image Suitable for Intra-mesh Density Structure", Papers of the Society of Electronic Communications, 1985/4, Vol. J68-D, No. 4, an ordered dither method, a minimizer average error method, an intra-mesh pixel distribution method, and the like have been reported, and have been put into practical applications.

Upon formation of a half tone image, it is important to simultaneously improve the reproducibility of a density tone characteristic (gradation) and the resolution, and it is also important to suppress formation of a texture offensive to the eyes.

For example, assuming that a laser beam printer (LBP) for a relatively expensive OA equipment is used, in the ordered dither method, since the number of tones is determined by the matrix size, the matrix size must be increased to obtain a sufficient tone characteristic. However, when the matrix size is increased, black dots are arranged in large unit areas, resulting in a decrease in resolution.

When the minimizer average error method or a similar error diffusion method is used, a relatively good tone characteristic can be obtained. A summary of this method is described in, e.g., J. F. Javis, C. N. Judice, and W. H. Ninke, "A Survey of Techniques for the Display of Continuous Tone Pictures on Bilevel Displays", Computer Graphics and Image Processing 5 (1976), pp. 36–38. Many examples of, e.g., a generation method for a weighting matrix $\alpha$ used in this minimizer average error method have been proposed.

However, in the minimizer average error method or the error diffusion method, a unique stripe-pattern texture is formed, and is offensive to the eyes. Since this method is a method for minimizing an error of the overall image from an original image upon binarization with a predetermined threshold value, an error occurring at a given point sequentially propagates to pixels to be processed later. A texture formed in this manner is easily observed on a region where a change in tone level is small (the spatial frequency is low).

In this manner, when a density image is binarized and output using, e.g., an LBP for an OA equipment, and the ordered dither method is used, if the tone characteristic is to be improved, the resolution is to be impaired. Contrary to this, when the resolution is to be increased, the tone characteristic is degraded. Thus, it is difficult to simultaneously improve both the tone characteristic and the resolution. On the other hand, when the minimizer average error method is used, the tone characteristic can be improved, but a texture offensive to the eyes is undesirably formed on a region having a small change in tone level.

It is important for the LBP to prevent, e.g., a thin line from being disconnected or to prevent a short defect from being formed in a portion to be completely painted in black, as shown in FIG. 1, so as to clearly print, e.g., characters. For this reason, the LBP is designed to set an effective size of a black dot to be larger than a logical size of a pixel (determined by a minimum increment of raster scanning). More specifically, as shown in FIG. 2, a thin line having a one-dot width is drawn to be thicker than a logical one-dot width, so that a thin line can be prevented from being disconnected or a short defect can be prevented from being formed between raster scanning lines in a black painting region even under the influence of various noise components or variations in parameters.

In this manner, in the prior art, the intensity of each pixel is independently considered, i.e., it is "0" or "1" for an output binary image, and is a real number within a range between "0" and "1" for an input density image. For this reason, the fact that a black dot per pixel is printed to be larger in practice, and projects into an adjacent pixel region is ignored. Thus, in an LBP in which a degree of an increase in size of a black dot is large, an image to be obtained is unnecessarily darkened, or a dark portion (shadow) in an image undesirably has a batter.

SUMMARY OF THE INVENTION

The present invention has been made in consideration of the above situation, and has as its object to provide a system and method for converting a continuous tone image into a half tone image, with which a continuous tone image can be converted into a pseudo half tone image having a good tone characteristic and a high resolution, and can obtain an image which can be prevented from being unnecessarily darkened, and is free from a batter.

According to the first aspect of the present invention, a system for converting a continuous tone image into a pseudo half tone image, which converts input image data expressed by a plurality of bits per pixel into output image data expressed by one bit per pixel, comprises: error storage means for storing errors generated when input image data of pixels are converted into output image data expressed by one bit per pixel; correction means for multiplying errors, stored in the error storage means, at pixels adjacent to a pixel to be converted with weighting coefficients so as to correct an input image data value of the pixel to be converted; threshold value storage means for storing threshold values having different values according to a position of the pixel to be converted, and used for determining a value of output image data; and comparison means for comparing the input image data value corrected by the correction means, and the threshold value stored in the threshold value storage means corresponding to the position of the pixel to be converted.

According to the second aspect of the present invention, a system for converting a continuous tone image into a pseudo half tone image, which converts input image data expressed by a plurality of bits per pixel into output image data expressed by one bit per pixel, comprises: error storage means for storing errors generated when input image data of pixels are converted into output image data expressed by one bit per pixel; image storage means for storing the output image data obtained by converting the input image data of the pixels; correction value calculation means for multiplying errors, stored in the error storage means, at pixels adjacent to a pixel to be converted with weighting coefficients so as to calculate a correction value of input image data of the pixel to be converted; first determination means for determining a value of the output image data on the basis of the image data value corrected by the correction value calculation means; second determination means for determining an error evaluation value at the pixel to be converted on the basis of output image data values at pixels adjacent to the pixel to be converted stored in the image storage means, and the output image data value at the pixel to be converted determined by the first determination means; and error calculation means for calculating an error generated upon conversion of the input image data at the pixel to be converted on the basis of the error evaluation value determined by the second determination means, and the correction value obtained by the correction value calculation means.

According to the third aspect of the present invention, a system for converting a continuous tone image into a pseudo half tone image, which converts input image data expressed by a plurality of bits per pixel into output image data expressed by one bit per pixel, comprises: error storage means for storing errors generated when input image data of pixels are converted into output image data expressed by one bit per pixel; image storage means for storing the output image data obtained by converting the input image data of the pixels; correction value calculation means for multiplying errors, stored in the error storage means, at pixels adjacent to a pixel to be converted with weighting coefficients so as to calculate a correction value of input image data of the pixel to be converted; first determination means for determining a value of the output image data on the basis of the image data value corrected by the correction value calculation means, and the threshold value stored in the threshold value storage means corresponding to a position of the pixel to be converted; second determination means for determining an error evaluation value at the pixel to be converted on the basis of output image data values at pixels adjacent to the pixel to be converted stored in the image storage means, and the output image data value at the pixel to be converted determined by the first determination means; and error calculation means for calculating an error generated upon conversion of the input image data at the pixel to be converted on the basis of the error evaluation value determined by the second determination means, and the correction value obtained by the correction value calculation means.

According to the fourth aspect of the present invention, a method for converting a continuous tone image into a pseudo half tone image, which converts input image data expressed by a plurality of bits per pixel into output image data expressed by one bit per pixel, comprises the steps of: a) dividing an input image into n×n submatrices (n is a positive integer not less than 2); b) assigning different threshold values to the divided submatrices, respectively; c) multiplying errors generated upon binarization of adjacent points corresponding to an objective point of the input image with predetermined weighting coefficients so as to obtain a correction density of the objective point; and d) comparing the correction density with the threshold value corresponding to the objective point, and determining according to a comparison result whether the objective point is a black dot or a white dot.

According to the fifth aspect of the present invention, a method for converting a continuous tone image into a pseudo half tone image, which converts input image data expressed by a plurality of bits per pixel into output image data expressed by one bit per pixel, comprises the steps of: a) storing errors generated upon conversion of the input image data of the pixels; b) storing output image data obtained upon conversion of the input image data of the pixels; c) multiplying the errors, stored in the step a), at pixels adjacent to a pixel to be converted with weighting coefficients so as to calculate a correction value of input image data of the pixel to be converted; d) determining an output image data value on the basis of the input image data value corrected in the step c); e) determining an error evaluation value at the pixel to be converted on the basis of the output image data values at the pixels adjacent to the pixel to be converted stored in the step b), and the output image data value at the pixel to be converted determined in the step d); and f) calculating an error generated upon conversion of the input image data at the pixel to be converted on the basis of the error evaluation value determined in the step e), and the correction value obtained in the step c).

According to the sixth aspect of the present invention, a method for converting a continuous tone image into a pseudo half tone image, which converts input image data expressed by a plurality of bits per pixel into output image data expressed by one bit per pixel, comprises the steps of: a) storing errors generated upon conversion of the input image data of the pixels; b) storing output image data obtained upon conversion of the input image data of the pixels; c) multiplying the errors, stored in the step a), at pixels adjacent to a pixel to be converted with weighting coefficients so as to calculate a correction value of input image data of the pixel to be converted; d) determining an output image data value on the basis of the input image data value corrected in the step c), and the threshold value corresponding to a position of the pixel to be converted; e) determining an error evaluation value at the pixel to be converted on the basis of the output image data values at the pixels adjacent to the pixel to be converted stored in the step b), and the output image data value at the pixel to be converted determined in the step d); and f) calculating an error generated upon conversion of the input image data at the pixel to be converted o the basis of the error evaluation value determined in the step e), and the correction value obtained in the step c)

With this arrangement, a threshold value for determining the value of output image data is changed in accordance with the pixel position of input image data. For this reason, a texture formed in a region having a small change in tone level in an image when the conventional minimizer average error method (with a constant threshold value) is used can be suppressed. In addition, a threshold value is prepared and used as a two-dimensional repetitive pattern similar to a dither matrix in the ordered dither method, thus improving a tone characteristic.

In consideration of a projection from an adjacent point to a pixel to be converted determined according to a result of binarization processing (first determination means) of the pixel to be converted (error evaluation value), the error calculation means calculates an error. The error calculated in this manner influences binarization of the following points, and the projection is consequently absorbed in processing, thus preventing an image from being unnecessarily darkened.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram showing an embodiment of an image data converter in a system for converting a continuous tone image into a pseudo half tone image according to the present invention;

FIG. 4 shows a storage content of a threshold-value matrix memory shown in FIG. 3;

FIG. 5 shows a storage content of an error memory shown in FIG. 3;

FIGS. 10 and 11 are views for explaining a method for obtaining a darkness DQ when a point Q is assumed to be a black dot;

FIG. 12 is a table showing values DQ according to combinations of Da through Dd and DQ;

FIG. 13 is a view for explaining a method for obtaining the darkness DQ when the point Q is assumed to be a white dot;

FIG. 14 is a view for explaining correction of a density value;

FIG. 15 shows an example of a threshold value matrix; and

FIGS. 16A and 16B are flow charts showing processing of an image data converter of the second embodiment.

DETAILED DESCRIPTION OF THE PREFERRED EMBODIMENTS

Figure 1:
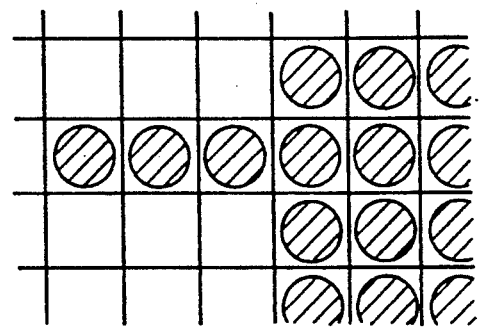
FIGS. 1 and 2 are views for explaining the fact that a black dot in a laser beam printer (LBP) has an increased effective size in the prior art.
Figure 2:
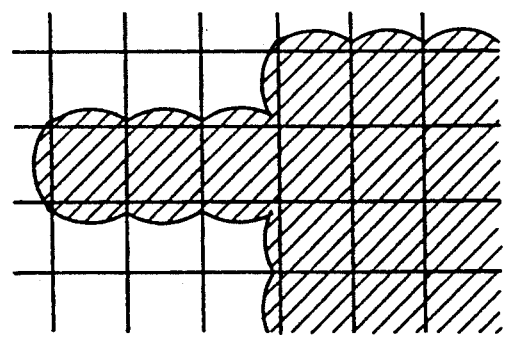

An embodiment of the present invention will be described below with reference to the accompanying drawings. FIG. 3 is a block diagram showing an arrangement of an image data converter for converting a continuous tone image into a pseudo half tone image according to this embodiment. In FIG. 3, an image data converter 10 sequentially receives input data J, digitizes them, and parallelly outputs binary densities $\overline{D}$ (pseudo half tone data) for eight pixels (one byte) for every 8 cycles. The image data converter 10 includes a computing circuit 11 for obtaining a correction density J'Q using an error E generated upon digitization of a point adjacent to a point Q to be processed, a comparator 12 for comparing the correction density J'Q obtained by the computing circuit 11 with a threshold value S' corresponding to the position of the point Q, and outputting a binary density $\overline{DQ}$ ($\overline{DQ}$ has a value of "0" or "1"; Q represents a point to be processed), and an output circuit 13 for outputting the binary densities $\overline{DQ}$ output from the comparator 12 as one-byte data ($\overline{D}$) for every 8 cycles.

The image data converter 10 exchanges data between a threshold-value matrix memory 20 for storing a threshold value matrix (to be described later), and an error memory 21 for storing an error E generated upon binarization of each pixel. Threshold value data S' read out from the threshold-value matrix memory 20 is used in processing by the comparator 12. FIG. 4 shows the content of the threshold value matrix stored in the threshold-value matrix memory 20. On the other hand, the error memory 21 has a storage capacity corresponding to two lines. The memory 21 loads errors Ea through Ed at pixel positions adjacent to a point Q to be processed upon digitization processing, and is written with an error EQ of the point Q obtained based on the digitization processing result at a predetermined address position. Before processing of the next point is started, data of an error E at a point on the right of a point d (see FIG. 5 to be described later) is read out from the memory 21. FIG. 5 shows the content stored in the error memory 21. The first row includes errors Eb through Ed corresponding to the point Q to be processed, and the second row includes an error Ea. The roles of the contents of the first and second rows are changed every time processing for one line is completed. Note that the errors Ea through Ed (density differences obtained upon digitization of an input image) are held in an internal register (not shown) of the computing circuit 11, and are used in processing.

The operation of this embodiment will be described below.

The following description will be made assuming that the intensity of a point Q is represented by IQ, and the darkness of the point Q is defined as DQ=1−IQ. Therefore, in the following description, white is expressed by "0", and black is expressed by "1". A binary density $\overline{DQ}$ has a value of either "0" or "1" according to a comparison result in the comparator 12.

The operation will be described below with reference to the flow chart shown in FIG. 6. The basic concept of this embodiment is the same as that of the conventional minimizer average error method. That is, a darkness J of a point Q to be digitized is corrected by weighting an error E generated upon digitization processing of points adjacent to the point Q, and thereafter, digitization is performed based on a predetermined threshold value.

Figure 7:
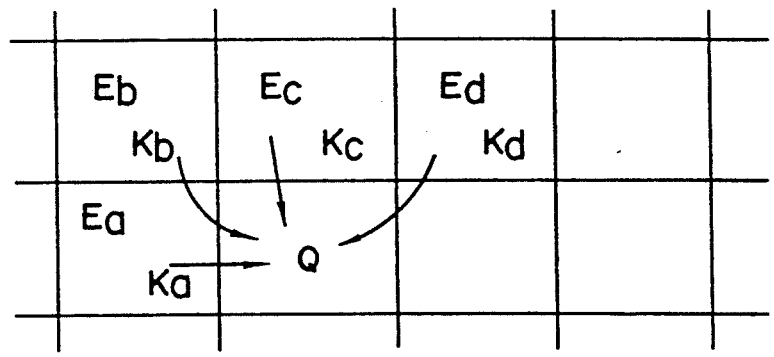
FIG. 7 is a view for explaining a weighting operation of an error E for a point Q.

The computing circuit 11 of the image data converter 10 reads a darkness JQ (assumed to be a real number within a range between 0 and 1) of a point Q of an input image (step S1). The image data converter 10 reads errors Ea through Ed stored in the error memory 21 and generated upon digitization of adjacent points corresponding to the point Q of the input image (step S2), and stores them in its internal register. Note that various ranges of adjacent points, and various methods of weighting errors E of adjacent points for a point Q to be used in correction of a density JQ may be employed. However, in this embodiment, errors Ea through Ed of four points are used, as shown in FIG. 7.

If a correction density corresponding to a density JQ at the point Q is represented by J'Q, J'Q is expressed by the following equation by respectively multiplying the errors Ea through Ed with weighting coefficients Ka through Kd:

$$JQ = JQ + \frac{1}{Ka + Kb + Kc + Kd} \cdot \qquad (1)$$

$$(KaEa + KbEb + KcEc + KdEd)$$

An error matrix representing in detail how to assign the weighting coefficients Ka through Kd is given by the following equation (2):

$$\text{Error Matrix} = \begin{vmatrix} \frac{1}{8} & \frac{1}{4} & \frac{1}{8} \\ \frac{1}{2} & * & - \end{vmatrix} \qquad (2)$$

Therefore, we have:

$$J'Q = JQ + (\tfrac{1}{8}Ea + \tfrac{1}{4}Eb + \tfrac{1}{8}Ec + \tfrac{1}{2}Ed) \qquad (3)$$

In this example, since the sum the coefficients is 1, and each coefficient has a of $2^{-n}$, calculations are easy.

The error matrix may be given by the following equation (4):

$$\text{Error Matrix} = \begin{vmatrix} \frac{1}{8} & \frac{1}{4} & \frac{1}{8} \\ \frac{1}{4} & * & - \end{vmatrix} \qquad (4)$$

Then, we have:

$$J'Q = JQ + (1/4 Ea + 1/8 Eb + 1/4 Ec + 1/8 Ed) \qquad (5)$$

The sum of the coefficients of the error matrix used in this case has a value ($\tfrac{3}{4}$) smaller than 1. When the error matrix given by equation (4) is used, even when small errors are uniformly formed over a wide range, since the upper limit of accumulated errors can be determined, the value J'Q can be increased although the value JQ is small, and hence, the point Q can be prevented from being printed as a black dot. In this example, even when uniform errors δ are generated in the entire image, accumulated errors never exceed 3δ.

When the correction density J'Q is obtained in this manner, the image data converter 10 obtains an address of the threshold-value matrix memory 20 corresponding to the position of the point Q, and reads threshold value data S' corresponding to the point Q from the threshold-value matrix memory 20 (step S3). FIG. 4 shows the threshold value matrix used in this case. The threshold value matrix used in this embodiment will be described below.

Assuming that a threshold value used for determining based on the value of the correction density J'Q whether the point Q is a white or black dot is represented by T, if J'Q<T, the point Q is determined as a white dot ($\overline{DQ}=0$); if J'Q≧T, the point Q is determined as a black dot ($\overline{DQ}=1$). Conventionally, the threshold value is set to be a constant value (normally, T=0.5 as an intermediate value between "0" and "1"). For this reason, since errors generated at pixels subjected to digitization processing previously sequentially influence digitization processing of pixels to be processed later, they appear as a texture on a region having a small change in tone level. Therefore, according to the present invention, the threshold value is changed according to the pixel position as follows:

$$T = 0.5 + S \qquad (6)$$

S in equation (6) above is a value satisfying $-0.5 < S \leq 0.5$ according to a pixel position. A matrix, which fetches a constant "0.5" of equation (6), of threshold values S' (=0.5+S) whose average value yields $\tfrac{1}{2}$, and have values within a range between 0 and 1 corresponds to the threshold value matrix shown in FIG. 4. The threshold values S' of the threshold value matrix are similar to those in a dither matrix used in the ordered dither method, and have values corresponding to submatrices of an image divided into 6×6 submatrices in this embodiment.

In this manner, when a threshold value which varies in a two-dimensional repetitive pattern is used, the following effects can be obtained. Since black and white dots are concentrated at a high, uniform spatial frequency like in a dot photograph of a newspaper, a stripe-pattern texture which is conspicuous in a region having a small change in tone level in the conventional method can be suppressed. In a region having a large change in tone level, the influence of errors is enhanced, and black pixels can be prevented from being unnecessarily dispersed unlike in the ordered dither method. As a result, a sharp edge can be expressed.

Figure 6:
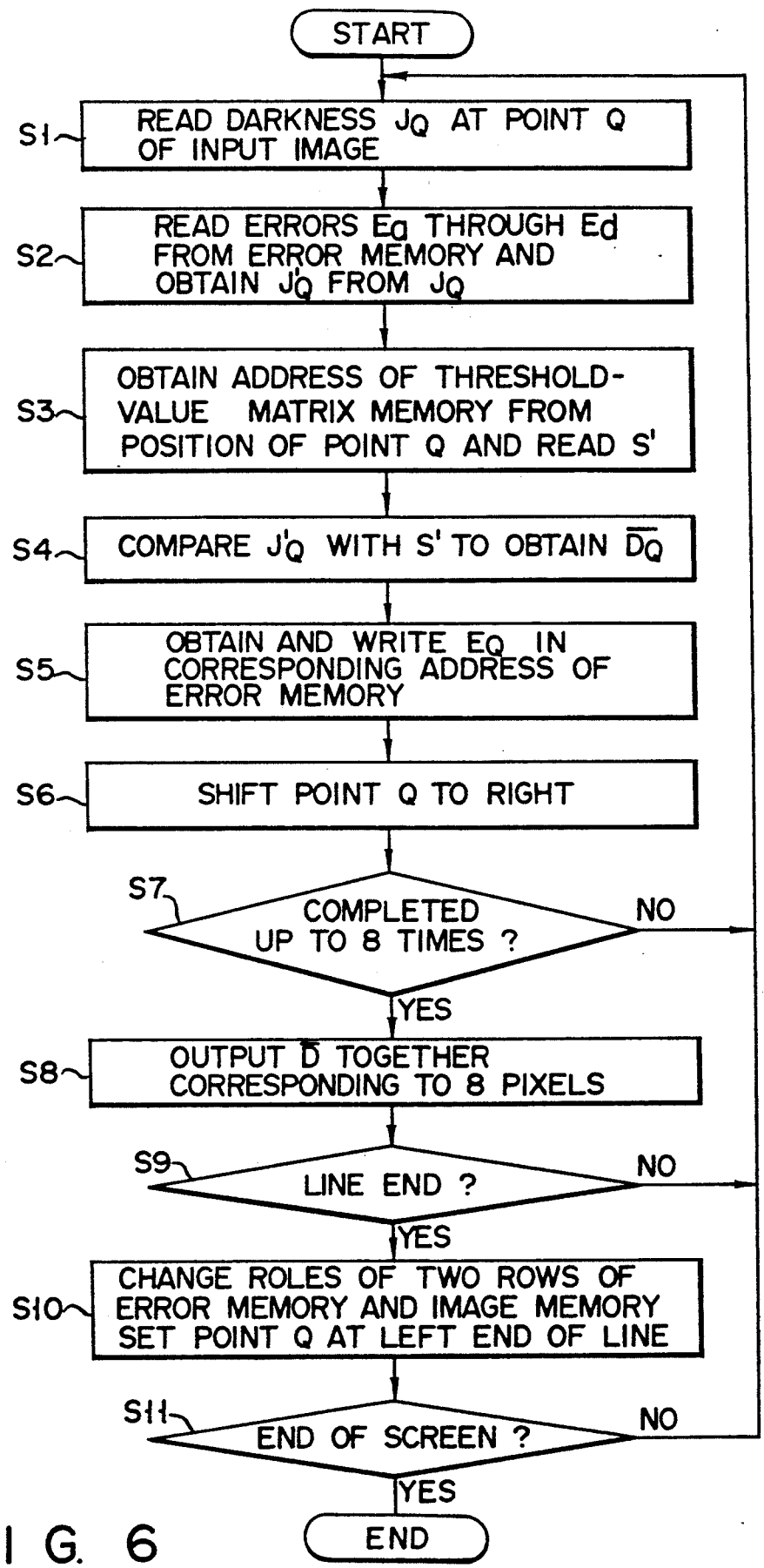
FIG. 6 is a flow chart showing processing of the image data converter shown in FIG. 3.

Referring back to the flow chart shown in FIG. 6, when the threshold value data S' is read in step S3, the comparator 12 compares the correction density J'Q with the threshold value S' corresponding to the position of the point Q, thereby determining whether the point Q is a white or black dot (the value of the binary density $\overline{DQ}$; "0" or "1") (step S4).

Then, the image data converter 10 obtains an error EQ occurring in the digitization processing of the point Q, and writes it at the corresponding address of the error memory 21 (step S5). The error EQ is calculated based on the binary density $\overline{DQ}$ obtained in step S4, and the density J of the input data as follows:

$$EQ = JQ - \overline{DQ} \qquad (7)$$

Upon completion of processing about the point Q, an object to be processed is shifted to the next, right point in the same line, and a new error Ed corresponding to this point is read from the error memory 21 (step S6).

Thereafter, the above-mentioned processing operations in steps S1 through S6 are repeated eight times (step S7), and binary densities $\overline{D}$ for eight pixels as a result of the above-mentioned processing are output (step S8). Furthermore, processing up to step S8 is repeated until the end of a line.

When processing for one line is completed, a point Q as an object to be processed is shifted to the left end of the next line, and processing for the next line is started. The roles of the two-line storage areas allocated in the error memory 21 are switched (step S8). More specifically, the first and second rows are switched in the error memory 21, and the content of the second row in the previous processing becomes the content of the first row.

The above-mentioned processing operations in steps S1 through S8 are repeated for the entire image (all the lines) (step S11).

In this manner, a threshold value for determining whether a point (pixel) to be processed is a black or white dot is changed according to the pixel position using a two-dimensional repetitive pattern, as shown in the threshold value matrix shown in FIG. 4. Thus, a texture generated in the conventional minimizer average error method (with a fixed threshold value) can be suppressed, and smooth tone expression can be obtained. In addition, a resolution can be increased, and a sharp edge can be provided, thus obtaining an image with high image quality.

The second embodiment of the present invention will be described hereinafter.

In the first embodiment, a threshold value for determining whether a point to be processed is a black or white dot is changed according to the pixel position using a two-dimensional repetitive pattern. In the second embodiment, when a one-dot size in an output apparatus which can only perform binary expression in units of pixels is larger than a logical size, a continuous tone image is converted into a pseudo half tone image in consideration of an increase in size of a dot into another dot (projecting portion).

In the second embodiment, an image memory 13 is added. The image memory 13 has a storage capacity corresponding to two lines, and stores binary densities $\overline{D}$ of pixels. The first row of the memory 13 includes binary densities $\overline{Db}$ through $\overline{Dd}$ corresponding to a point Q to be processed, and the second row includes a binary density $\overline{Da}$. A method of updating (writing) or looking up (reading out) a data content is the same as that of an error memory 12. Note that the error memory 12 and the image memory 13 need not always be separately arranged, but may be arranged as one memory element.

Figure 9:
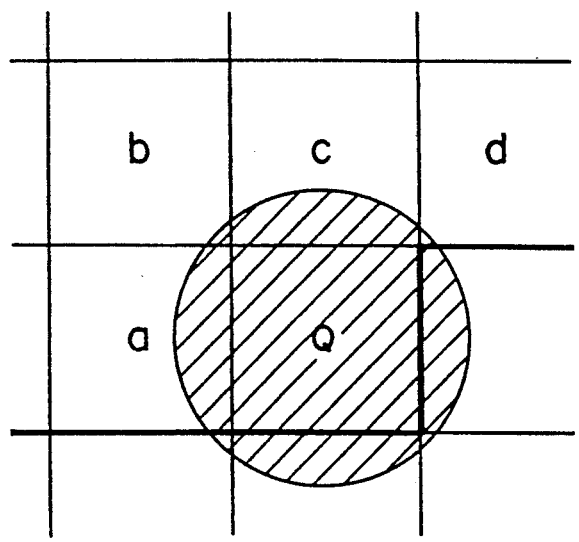
FIG. 9 is a view for explaining an increase in size of a black dot in the second embodiment.

FIG. 9 shows a model showing an increase in size of a black dot at the point Q. In FIG. 9, the area of one box (one dot) is represented by "1", the areas of a black dot projecting into boxes of points a and c are respectively represented by F, and the areas of the black dot projecting into boxes of points b and d are respectively represented by f.

In this embodiment, processing for pixels of an input image is performed while scanning from the left end of the first row toward the right end, and from the upper row (first row) to the lower row. As shown in FIG. 9, if a point to be processed is the point Q, errors Ea through Ed of already processed four points (a, b, c, and d) of eight points around the point Q, and a binary density $\overline{DQ}$ are used in processing.

The following description will be made assuming that the intensity of the point Q is represented by IQ, and the darkness of the point Q is defined as DQ = I − IQ. In the following description, white is expressed by "0", and black is expressed by "1". The binary density $\overline{DQ}$ has a value of either "0" or "1". However, the darkness Q is a darkness (density) of the point Q in consideration of an increase in size of a black dot toward the upper left side of a bold line in FIG. 9 or an increase in size of a black dot from the upper left side, and is a real number.

The value of the darkness DQ is considered as follows. For example, when points a, b, c, and d in FIG. 9 are white dots (i.e., $\overline{Da}=\overline{Db}=\overline{Dc}=\overline{Dd}=0$), if the point Q is a black dot, the value DQ is assumed to be given by $(1+2F+2f)$ in consideration of projecting areas 2F of the black dot into the points a and c, and projecting areas 2f of the black dot into the points b and d. In this case, F and f are experimentally obtained in correspondence with the characteristics of printer apparatuses (e.g., LBPs). As a printer apparatus has a larger increase in size of a dot, the values F and f are increased.

Figure 10:
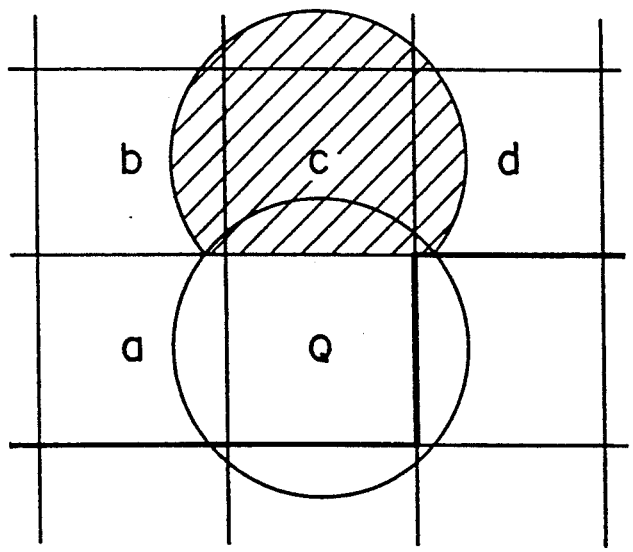

FIGS. 10 and 11 are views for explaining two examples of a method of obtaining the darkness DQ when the point Q is determined as a black dot. As shown in FIG. 10, when only a point c immediately above the point Q is a black dot, since the area of the hatched portion in FIG. 10 has already been taken into consideration, a value obtained by adding the area "1" of the point Q itself and the projecting area F into the point a corresponds to DQ $(=1+F)$. As shown in FIG. 11, if only a point b obliquely above and left to the point Q is a black dot, if the area of a cross-hatched portion in FIG. 11 is represented by g, the projecting area into the point c is expressed by (F−g). The same applies to the projecting area into the point a. A value obtained by adding the projecting area f into the point d to the above projecting areas corresponds to DQ $(=1+2F-2g+f)$. Values of DQ according to a black-and-white pattern of the points a through d when the point Q is determined as a black dot are shown in the column of $\overline{DQ}=1$ in FIG. 12.

FIG. 13 is a view for explaining an example of a method for obtaining the darkness DQ when the point Q is determined as a white dot. As shown in FIG. 13, when the point c immediately above the point Q and the point a on the left side of the point Q are black dots ($\overline{Da}=\overline{Dc}=1$, $\overline{Db}=\overline{Dd}=0$), a value obtained by subtracting an overlapping area g of the projecting areas from the points a and c from the sum 2F of the projecting areas from the points a and c corresponds to DQ $(=2F-g)$. Values of DQ according to a black-and-white pattern of the points a through d when the point Q is determined as a white dot are shown in the column of =0 in FIG. 12.

The operations will be described below with reference to the flow charts shown in FIGS. 16A and 16B. In steps S21 and S22 in FIG. 16A, the same processing operations as in steps S1 and S2 in FIG. 6 are executed, and a detailed description thereof will be omitted.

When a correction density J'Q is obtained, an image data converter 10 obtains an address of a threshold-value matrix memory 11 corresponding to the position of a point Q, and reads threshold value data S' (step S23). FIG. 15 shows a threshold value matrix used in this processing. The threshold value matrix used in this embodiment will be described below.

If a threshold value used for determining, based on the correction density J'Q, whether the point Q is determined as a black or white dot is represented by T, the threshold value T is preferably set to be (DQ(0)+DQ(1))/2 for each combination of $\overline{Da}$, $\overline{Db}$, $\overline{Dc}$, and $\overline{Dd}$ in view of minimizing the sum of the absolute values of errors (where DQ(0) and DQ(1) are the values when $\overline{DQ}=0$ and when $\overline{DQ}=1$). FIG. 12 summarizes correspondences between combinations of $\overline{Da}$, $\overline{Db}$, $\overline{Dc}$, and $\overline{Dd}$ (0 or 1), and corresponding values of $\overline{DQ}$ (0 or 1). More specifically, (DQ(0)+DQ(1))/2 has an intermediate value between values of $\overline{DQ}=0$ and $\overline{DQ}=1$. As can be apparent from calculations based on the values shown in FIG. 12, (DQ(0)+DQ(1))/2 is rewritten as (0.5+F+ε). ε includes f and g, but does not include F. Normally, F has a value of about 0.2 through 0.4, and f and g have values considerably smaller than 0.1. Therefore, a fixed value (0.5+F) can be sufficiently used as the threshold value.

In this embodiment, in consideration of a threshold value component S determined according to the position of the point Q on an image, the threshold value T is given by:

$$T = 0.5 + F + S \quad (8)$$

More specifically, if $J'Q < T$, the point Q is determined as a white dot; if $J'Q \leq T$, the point Q is determined as a black dot.

In equation (8) above, S is a value having a two-dimensional repetitive pattern similar to the dither matrix in the ordered dither method, and falling within a range of $-\frac{1}{2}$ and $\frac{1}{2}$ to yield an average value $=0$. A matrix, which fetches a constant "0.5" of equation (8), of threshold values S' whose average value yields $\frac{1}{2}$, and have values within a range between 0 and 1 corresponds to the threshold value matrix shown in FIG. 15. The threshold values S' of the threshold value matrix have values corresponding to submatrices of an image divided into 4×4 submatrices. Therefore, the threshold value T used for determining, based on the correction density J'Q, whether the point Q is determined as a black or white dot is the sum (S'+F) of a threshold value S' corresponding to the point Q and F.

In this manner, when the threshold value which changes in a two-dimensional repetitive pattern is used, the following two effects can be obtained. First, since black and white dots are concentrated at a high, uniform spatial frequency like in a dot photograph of a newspaper, a texture can be suppressed. Second, tone expression quality can be improved. As described above, since the sum of the coefficients of the error matrix is set to be smaller than 1 ($\frac{3}{4}$ in this embodiment), accumulated errors have an upper limit, and do not exceed a value 3 times the difference between an input value JQ in units of pixels and an output $\overline{DQ}$ in this embodiment. Therefore, for example, when the darkness JQ has a constant small value j on the entire image, $J'Q \leq j + 3j$ is satisfied. If the threshold value T is set to be a constant $\frac{1}{2}$ like in a conventional method, all the dots of an output image become white dots when $j < \frac{1}{8}$ or less, and a tone characteristic of a highlight portion cannot be satisfactorily expressed. In this embodiment, since a threshold value component S determined according to the position of the point Q on an image is used, portions having a small threshold value periodically appear in the image, and a larger number of tone levels can be expressed by the same principle as the dither method.

Referring back to the flow chart shown in FIG. 16A, when the threshold value data S' is read in step S23, the image data converter 10 compares the correction density J'Q with a threshold value T (=S'+F) corresponding to the position of the point Q, thereby determining whether the point Q is a white or black dot (value of the binary density $\overline{DQ}$, "0" or "1") (step S24).

A darkness (density) DQ (error evaluation value) at the point Q is obtained on the basis of $\overline{Da}$, $\overline{Db}$, $\overline{Dc}$, and $\overline{Dd}$, and the value $\overline{DQ}$ determined in step S24 (step S25). This value is determined in accordance with the correspondences between $\overline{Da}$ through $\overline{Dd}$, and $\overline{DQ}$, as shown in FIG. 12.

An error EQ at the point Q used in processing of the next point is obtained as EQ=J'Q−DQ based on DQ obtained in step S25 (step S26).

The error EQ obtained in step S26, and the binary density $\overline{DQ}$ obtained in step S24 are written at the corresponding addresses of the error memory 12 and the image memory 13, respectively (step S27).

Upon completion of processing for the point Q, an object to be processed to a point on the right side of the point Q on the same line, and a new error Ed and a new binary density $\overline{Dd}$ corresponding to this point are read from the error memory 12 and the image memory 13, respectively (step S28).

Thereafter, the above-mentioned processing operations in steps S21 through S28 are repeated eight times (step S29 in FIG. 16B), and binary densities $\overline{D}$ for eight pixels obtained as a result of the above-mentioned operations are output (step S30). Furthermore, the processing operations up to step S30 are repeated until the end of the line (step S31).

Upon completion of one-line processing, the point Q to be processed is set at the left end of the next line, and processing for the next line is started. The roles of two-line storage areas of the image memory 13 and the error memory 12 are changed (step S32). More specifically, in each of the image memory 13 and the error memory 12, the first and second rows are changed, and the content of the second line in the previous line processing becomes the content of the first row.

The processing operations in steps S21 through S32 are repeated for the entire image (all the lines) (step S33).

In this manner, a pseudo half tone display can be performed in consideration of an increase in size of a dot in an LBP for an OA equipment which is required to prevent disconnection of a thin line, a short defect between raster scanning lines in a black painting region, or the like under the influence of various noise components or variations in parameters. Thus, problems of the conventional method can be solved, that is, an image can be prevented from being unnecessarily darkened or a shadow portion can be prevented from forming a batter.

Figure 8:
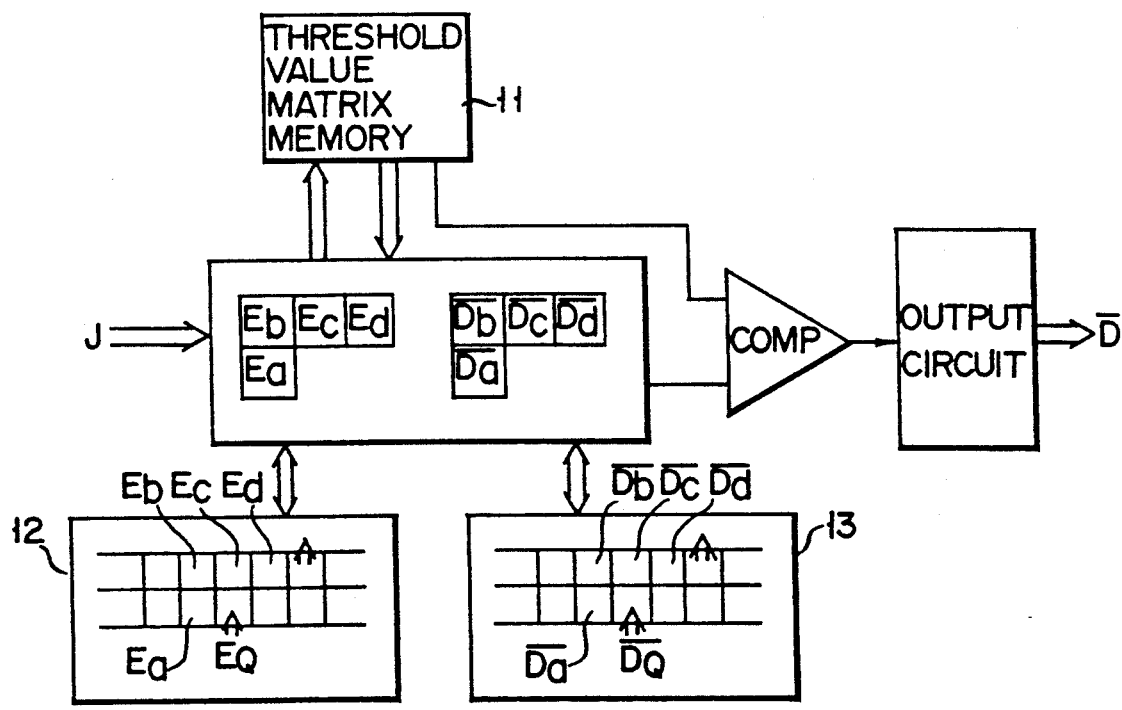
FIG. 8 is a block diagram showing the second embodiment of the present invention.

In each of the above embodiments, processing is performed using the arrangement shown in the block diagram of FIG. 3 or 8. However, a hardware arrangement need not always be employed, and the overall arrangement may be constituted as a program of a microprocessor or a DSP (digital signal processor).

The operations of the image data converter 10 have been described with reference to the flow chart shown in FIG. 6 or FIGS. 16A and 16B. In practice, the respective steps need not always be sequentially executed, but most of the steps may be parallelly executed using a hardware arrangement (by, e.g., pipeline processing).

In each of the above embodiments, an LBP has been exemplified. However, the present invention can be applied to a case wherein continuous tone expression is approximately made using other output apparatuses which can only perform binary expression in units of pixels.

In the first embodiment, an input image is divided into 6×6 submatrices, in the second embodiment, an input image is divided into 4×4 submatrices, and corresponding threshold value matrices are used. However, the submatrix size is not limited to those of the above embodiments.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. A system for converting continuous tone image into a pseudo half tone image, which converts input image data expressed by a plurality of bits per pixel into output image data expressed by one bit per pixel, comprising:
  error storage means for storing errors generated when input image data of pixels are converted into output image data expressed by one bit per pixel;
  correction means for multiplying errors, stored in said error storage means, at pixels adjacent to a pixel to be converted with weighting coefficients so as to correct the density of an input image data value of the pixel to be converted;
  threshold value storage means for storing threshold values having different values according to a position of the pixel to be converted, and used for determining a value of output image data; and
  comparison means for comparing the input image data value corrected by said correction means, and the threshold value stored in said threshold value storage means corresponding to the position of the pixel to be converted to provide an output binary image data value of the pixel to be converted.

2. A system according to claim 1, wherein when said correction means multiplies the errors at the pixels adjacent to the pixel to be converted with the weighting coefficients so as to correct the input image data value, said correction means multiplies the weighting coefficients whose sum is not more than 1.

3. A system for converting a continuous tone image into a pseudo half tone image, which converts input image data expressed by a plurality of bits per pixel into output image data expressed by one bit per pixel, comprising:
  error storage means for storing errors generated when input image data of pixels are converted into output image data expressed by one bit per pixel;
  image storage means for storing the output image data obtained by converting the input image data of the pixels;
  correction value calculation means for multiplying errors, stored in said error storage means, at pixels adjacent to a pixel to be converted with weighting coefficients so as to calculate a correction value of input image data of the pixel to be converted;
  first determination means for determining a value of the output image data on the basis of the image data value corrected by said correction value calculation means;
  second determination means for determining an error evaluation value at the pixel to be converted on the basis of output image data values at pixels adjacent to the pixel to be converted stored in said image storage means, and the output image data value at the pixel to be converted determined by said first determination means; and
  error calculation means for calculating an error generated upon conversion of the input image data at the pixel to be converted on the basis of the error evaluation value determined by said second determination means, and the correction value obtained by said correction value calculation means.

4. A system according to claim 3, wherein when said correction value calculation means calculates the correction values, the sum of the weighting coefficients for the adjacent pixels is not more than 1.

5. A system for converting a continuous tone image into a pseudo half tone image, which converts input image data expressed by a plurality of bits per pixel into output image data expressed by one bit per pixel, comprising:
  error storage means for storing errors generated when input image data of pixels are converted into output image data expressed by one bit per pixel;
  image storage means for storing the output image data obtained by converting the input image data of the pixels;
  correction value calculation means for multiplying errors, stored in said error storage means, at pixels adjacent to a pixel to be converted with weighting coefficients so as to calculate a correction value of input image data of the pixel to be converted;
  first determination means for determining a value of the output image data on the basis of the image data value corrected by said correction value calculation means, and the threshold value stored in said threshold value storage means corresponding to a position of the pixel to be converted;
  second determination means for determining an error evaluation value at the pixel to be converted on the basis of output image data values at pixels adjacent to the pixel to be converted stored in said image storage means, and the output image data value at the pixel to be converted determined by said first determination means; and
  error calculation means for calculating an error generated upon conversion of the input image data at the pixel to be converted on the basis of the error evaluation value determined by said second determination means, and the correction value obtained by said correction value calculation means.

6. A system according to claim 5, wherein when said correction value calculation means calculates the correction values, the sum of the weighting coefficients for the adjacent pixels is not more than 1.

7. A system according to claim 5, wherein the threshold value used when said first determination means determines the output image data value is changed according to the position of the pixel to be converted.

8. A method for converting a continuous tone image into a pseudo half tone image, which converts input image data expressed by a plurality of bits per pixel into output image data expressed by one bit per pixel, comprising the steps of:
  a) dividing an input image into n×n submatrices (n is a positive integer not less than 2);
  b) assigning different threshold values to the divided submatrices, respectively;
  c) multiplying errors generated upon digitization of adjacent points corresponding to an objective point of the input image with predetermined weighting coefficients so as to obtain a correction density of the objective point; and
  d) comparing the correction density with the threshold value corresponding to the objective point, and determining according to a comparison result whether the objective point is a black dot or a white dot.

9. A method according to claim 8, wherein a sum of the weighting coefficients multiplied with the errors generated upon digitization of the adjacent points in the step c) is not more than 1.

10. A method for converting a continuous tone image into a pseudo half tone image, which converts input image data expressed by a plurality of bits per pixel into output image data expressed by one bit per pixel, comprising the steps of:
  a) storing errors generated upon conversion of the input image data of the pixels;
  b) storing output image data obtained upon conversion of the input image data of the pixels;
  c) multiplying the errors, stored in the step a), at pixels adjacent to a pixel to be converted with weighting coefficients so as to calculate a correction value of input image data of the pixel to be converted;
  d) determining an output image data value on the basis of the input image data value corrected in the step c);
  e) determining an error evaluation value at the pixel to be converted on the basis of the output image data values at the pixels adjacent to the pixel to be converted stored in the step b), and the output image data value at the pixel to be converted determined in the step d); and
  f) calculating an error generated upon conversion of the input image data at the pixel to be converted on the basis of the error evaluation value determined in the step e), and the correction value obtained in the step c).

11. A method according to claim 10, wherein the step c) includes the step of multiplying the errors at the adjacent pixels with weighting coefficients whose sum is not more than 1.

12. A method for converting a continuous tone image into a pseudo half tone image, which converts input image data expressed by a plurality of bits per pixel into output image data expressed by one bit per pixel, comprising the steps of:
  a) storing errors generated upon conversion of the input image data of the pixels;
  b) storing output image data obtained upon conversion of the input image data of the pixels;
  c) multiplying the errors, stored in the step a), at pixels adjacent to a pixel to be converted with weighting coefficients so as to calculate a correction value of input image data of the pixel to be converted;
  d) determining an output image data value on the basis of the input image data value corrected in the step c), and the threshold value corresponding to a position of the pixel to be converted;
  e) determining an error evaluation value at the pixel to be converted on the basis of the output image data values at the pixels adjacent to the pixel to be converted stored in the step b), and the output image data value at the pixel to be converted determined in the step d); and
  f) calculating an error generated upon conversion of the input image data at the pixel to be converted on the basis of the error evaluation value determined in the step e), and the correction value obtained in the step c).

13. A method according to claim 12, wherein the step c) includes the step of multiplying the errors at the adjacent pixels with weighting coefficients whose sum is not more than 1.

14. A method according to claim 12, wherein the step d) includes the step of changing the threshold value used upon determination of the output image data value in accordance with the position of the pixel to be converted.

* * * * *